Sept. 12, 1961         W. P. KENNEDY         2,999,645
CAM CONTROLLED PATTERN IMPULSE SPRINKLER
Filed Sept. 8, 1959         3 Sheets-Sheet 1
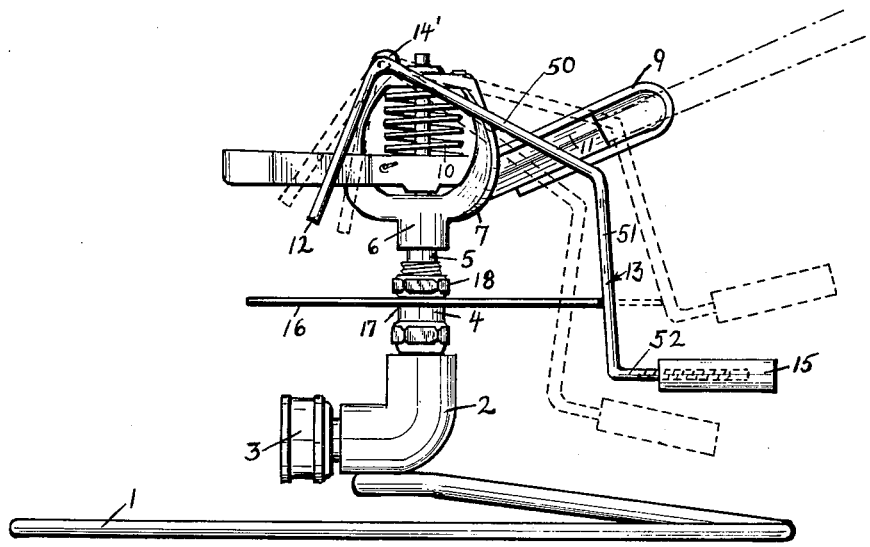
FIG. 1
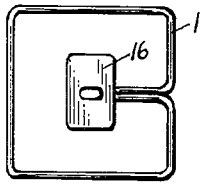
FIG. 2
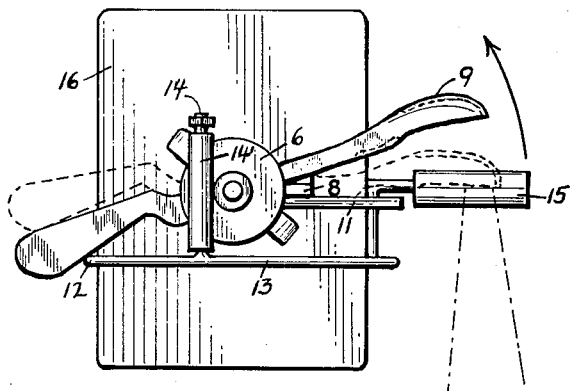
FIG. 3
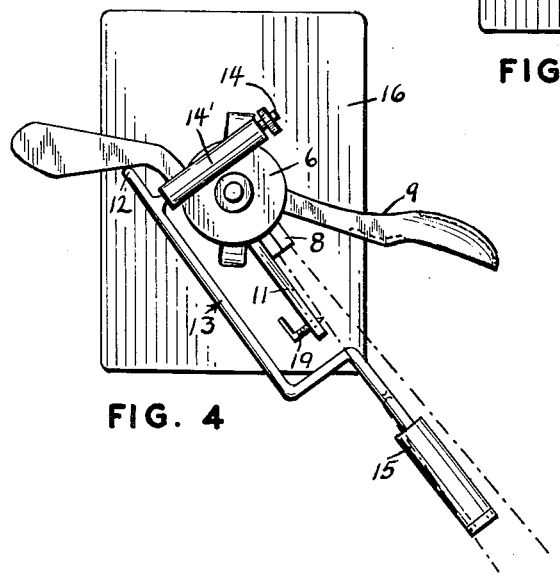
FIG. 4
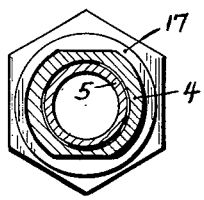
FIG. 5
INVENTOR:
WILLIAM P. KENNEDY
BY 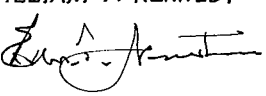
ATTORNEY Sept. 12, 1961 W. P. KENNEDY 2,999,645
CAM CONTROLLED PATTERN IMPULSE SPRINKLER
Filed Sept. 8, 1959 3 Sheets-Sheet 2

*INVENTOR:*
WILLIAM P. KENNEDY
BY

*ATTORNEY*

Sept. 12, 1961 W. P. KENNEDY 2,999,645
CAM CONTROLLED PATTERN IMPULSE SPRINKLER
Filed Sept. 8, 1959 3 Sheets-Sheet 3

INVENTOR:
WILLIAM P. KENNEDY
BY
ATTORNEY

United States Patent Office 2,999,645
Patented Sept. 12, 1961

2,999,645
CAM CONTROLLED PATTERN IMPULSE SPRINKLER
William P. Kennedy, 304 Freyer Drive, Marietta, Ga.
Filed Sept. 8, 1959, Ser. No. 838,576
15 Claims. (Cl. 239—230)

This invention relates to sprinkling devices and is more particularly concerned with controlled pattern irrigation sprinkling devices which spray water in a predetermined selectively variable pattern.

In the past water sprinklers have been designed which distribute water over a rectangular or non-circular area. Usually such water sprinklers have accomplished this function through the control of the nozzle opening of the water sprinkler or through the control of the position of the nozzle itself or the direction of spray of the water. Of necessity substantially all of these prior art devices have required water wheels and gear trains so that sufficient power was supplied to the mechanisms to accomplish the purpose. These devices therefore were expensive and complicated and involved substantial power losses in operation.

The simplest and least expensive type of long range jet sprinkler is the impulse type, the nozzle or nozzles of which are revolvably propelled by the impact of a water jet upon the slanted plate of an oscillating balanced clapper which delivers successive horizontal strokes to the nozzle structure, thus causing rotation by small steps. The use of cams in conjunction with this type of sprinkler has been attempted, utilizing a jet inclination deflecting vane controlled by a given cam but such structure will produce a grossly unbalanced water distribution in the sprayed area.

The present invention utilizes an impulse sprinkler and produces a progressively long or short water jet by variably limiting the oscillation distance of the balance clapper, the varying oscillation distances being controlled by means of a given cam in association with the clapper.

Briefly, to overcome the prior art disadvantages and provide a practical and inexpensive device, I have devised a sprinkler having a rotatable head provided with a nozzle through which water is directed in a radial direction. In close proximity to the mouth of the nozzle is a clapper pivotally mounted on the head so that one end of the clapper may project into the path of the stream of water and intermittently deflect the water from its radial path. The reaction from the water provides an impulse by which the head is rotated and by which the clapper is oscillated into and out of the path of the stream of water. I have also provided a variably positioned stop, on the head limiting the amplitude of oscillation, and a plurality of cams selectively engageable by a link and connected to the stop so that the position of the stop may be varied in accordance with the radial position of the head.

By such an arrangement, the amplitude of oscillation of the clapper may be varied in accordance with the radial position of the head whereby with low amplitude a majority of the water from the nozzle will be distributed in a confined area and at higher amplitude a majority of the water will be distributed at a greater distance from the sprinkler.

In accordance therewith, it is among the primary objects of the present invention to provide a novel, simple and improved cam controlled pattern sprinkling device which will discharge water at a constant volume over a uniform area by proportionally increasing the speed of nozzle rotation as the water is distributed over a shorter range and decreasing such speed of rotation as the water is distributed over a longer range.

Other objects of the invention are to provide a device of the character described with simple and effective means to station pattern cams, means to effect sprinkling of various size circles at full water flow without the use of cams, means to permit changing of cams at full water flow without wetting the user, means to compensate action due to various location water pressures and volumes, and means to facilitate visual alignment of the device in regard to the shape of the cam in operation.

A further object of the invention is to provide a sprinkler of this nature which is simple in construction, durable in structure and efficient in operation.

Numerous other objects, features and advantages of the present structure will be apparent from the consideration of the following specification when taken in conjunction with the accompanying drawings, in which:

FIG. 1 is a side view of a single cam version of a sprinkler constructed in accordance with the present invention.

FIG. 2 is a plan view in reduced scale, showing the alignment relation of a base to a cam in the sprinkler shown in FIG. 1.

FIG. 3 is a plan view of the head assembly and a cam of the sprinkler of FIG. 1, showing the shortest range position of the clapper.

FIG. 4 is a view similar to FIG. 3 and showing the longest range position of the clapper.

FIG. 5 is a plan view of a detail showing means to station a cam on the single cam version of the device shown in FIG. 1.

Figure 6:
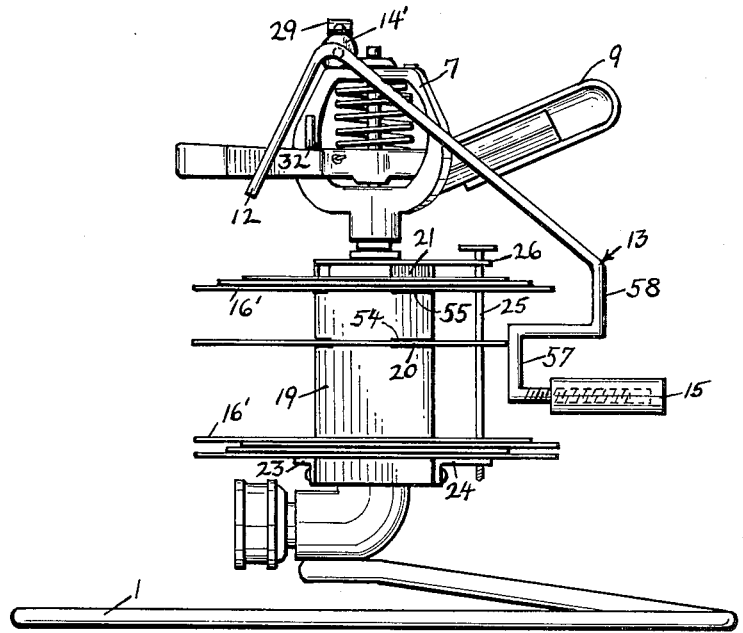
FIG. 6 is a side view of a modified form of the sprinkler of the present invention with interchangeable, variously shaped cams.

Referring to the drawings, the numeral 1 designates the base of the device formed of metal rod, as seen in FIG. 2, and shaped so that at least one side will parallel a cam side to facilitate proper alignment of the cams in regard to their respective area patterns. The base may be of other construction, the described version being preferable for reasons of convenience, stability and economy. Upon the base 1 is mounted an elbow 2 fitted at one end with a hose coupling 3 and vertically supporting a hollow standard 4 within which is rotatably mounted a hollow spindle 5 which supports an impulse sprinkler head 6. It will be understood that the device may be mounted upon a pipe line by fastening the standard 4 thereon in cases such as farm irrigation, or the device may be used in a permanent underground installation by enclosing it in a suitable container with a removable cover.

The sprinkler head 6 consists of a support 7 including a nozzle 8 shown more clearly in FIG. 3, a pivotally mounted clapper 9 which is urged by the spring 10 toward a nozzle projection 11 until such time as the clapper enters the path of the jet water stream from the nozzle and causes a deflection of the jet stream as shown in broken lines in FIG. 3. The jet then forces the clapper away from the projection 11 as shown in FIG. 4, such action causing the other end of the clapper to strike a stop comprising one end 12 of a pivoted lever 13, such action causing the head to turn about its axis in the direction of the arrow as shown in FIG. 3. It will be understood that some types of oscillating sprinkler heads to which the present invention is applicable use gravity or an additional or diffused water jet rather than the spring 10 to move the clapper. These sprinklers may be single or double ended at jet impact point with a swing either horizontal or vertical, back into the jet stream. My principle of controlling clapper travel distance by means of a lever is adaptable to either type of clapper urging means, the type having the spring 10 being the most desirable.

Referring now to lever 13, it will be seen in FIG. 1 that the end 12 extends upwardly to a fulcrum pin 14 and thence outwardly and downwardly to provide a supporting arm 50. As best seen in FIG. 3, the fulcrum pin 14 is journaled for rotation by a bearing member 14' mounted on support 7. The outer end of supporting arm 50 is bent abruptly downwardly to provide a cam engaging member 51 and then outwardly to provide a weight supporting arm 52. The outer end of the weight supporting arm 52 is provided with external threads for threadedly receiving a weight 15 having an internal bore and internal threads. By rotation of weight 15, the position of the weight may be adjusted with respect to the fulcrum pin 14 so as to impart proper action for varying water supply pressures and volumes.

Mounted upon the standard 4 is a cam 16 of thin rigid material, preferably aluminum, of a shape conforming generally to the shape of the area to be sprinkled. The standard 4 may be of a shape as shown in FIG. 5, having two sides of its threaded circular configuration flattened above its shoulder 17, the cam having a center hole compatible in size and shape to the standard at this point and being secured thereon by the nut 18. As shown in FIG. 1, the cam engaging member 51 of the lever 13 contacts the outside edge of the cam and as the head and lever travel around the cam the member 51 will move in and out upon the cam's edge and thereby move the opposite end 12 of the lever 13 proportionally so as to limit the clapper travel distance according to the position of the lever on a cam. This action is shown in FIGS. 1, 3 and 4.

When the lever 13 is extended, as shown in FIG. 4, the jet stream is longest and the rotation travel is slowest. When the lever 13 is down, as shown in FIG. 3, the jet stream is shortest and the rotation travel is fastest, and positions between these points are proportionally relative. When the clapper travel distance or amplitude is small, the clapper 9 moves in and out very quickly thus striking the lever end 12 rapidly and moving the head 6 rapidly. At the same time the clapper 9 deflects the jet stream to a degree that prevents a long range jet from fully developing. The fact that a greater nozzle rotation speed is imparted by the small amplitude also shortens jet travel. Thus, a fast moving, short range jet is produced.

When clapper travel distance or amplitude is large, the clapper 9 moves slowly, thus permitting a long range jet to develop. In this condition, the clapper 9 oscillates more slowly and strikes the lever end 12 with less force, thereby moving the head 6 more slowly providing a long range jet. Thus, when the lever 13 is properly balanced, the jet will range in and out over the area conforming to the shape of the cam 16, as the head 6 revolves around the cam 16, the outer portion of the area covered by the straight jet stream being shown in FIG. 4, and the inner portion of the area covered by the deflected stream caused by the clapper 9 striking the jet being shown in FIG. 3. This control of rotation speed causes the sprinkled water to fall over the area in a uniform coverage, it being understood that the longer ranges require a slower rotation than the shorter ranges.

The use of a weight 15, rather than a spring, to cause contact of the lever 13 with the cam's edge enables the lever pressure to be less as the lever 13 travels outward on the cam 16 and enables the corners of cams to be turned readily. The beating action of the clapper 9 upon the end 12 of the lever 13 eliminates the need of a roller on the lever's cam contact as the lever 13 is lifted slightly at each clapper beat and rests on the cam edge between each beat. Proper adjustment of the weight 15 is made by observing the lever lift on the beat and moving the weight until the lever lift is just discernable to the eye. The device will spray a true circle by simply removing the lever 13.

Various sized areas of land as defined by a given cam may be sprinkled by the same shaped cam by adjusting the conventional screw 19, shown in FIG. 4, the construction being such that the more the screw 19 projects into spray, the more the water is proportionally reduced in jet range.

Figure 7:
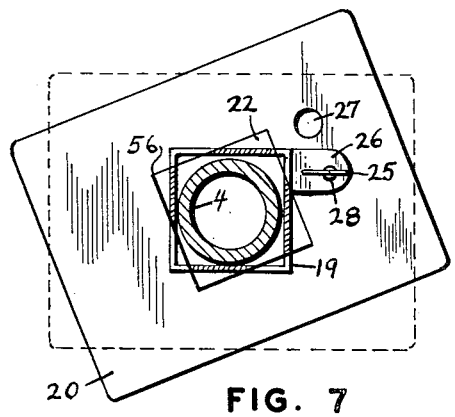
FIG. 7 is a cross sectional view of a portion of the sprinkler shown in FIG. 6.

Referring now to the embodiment shown in FIGS. 6 and 7, it will be seen that this embodiment includes, in place of the single cam 16, a plurality of cams 16' each of which may be selectively positioned for engagement by the lever 13. In more detail, this modified form of my invention includes a hollow square sleeve or support 19 disposed around and supported by the hollow standard 4. Centrally of the support 19 at each corner portion is a horizontally cut slot 54 so as to reduce the effective diameter of support 19. Slots 54 are aligned in a horizontal plane and are sufficiently wide to accommodate the thickness of one cam, such as cam 20, of a stack of cams 16' placed over the support 19. The remaining cams 16' are spaced above and below the cam 20.

For supporting the lower cams, I have provided outwardly extending brackets 23 and 24 on the lower portion of support 19. These brackets receive the lowermost cam of cams 16' and the other lower cams of cams 16' are received thereon. For supporting the upper cams of cams 16', I have provided recessed portions 21 spaced above the slots 54 to provide aligned ledges 55. It will be observed that each of cams 16' is provided with a non-circular or square central opening, such as opening 56, seen in FIG. 7. This opening 56 is slightly greater in size than the cross section of support 19 but has less width than the distance from the end of brackets 23 to the end of bracket 24. Thus, when the cams 16' are placed over the support 19, they will all normally rest upon the bottommost cam supported by brackets 23 and 24. If, however, one or a plurality of cams 16' are lifted above the ledges 55 and rotated, the ledges 55 will support by the lowermost of these upper cams the remaining cams thereabove.

If any one of the cams 16' such as cam 20 were positioned horizontally in alignment with slots 54, and the cam 20 then rotated, the sides defining the opening 56 would project into slots 54 and thereby be engaged therein so that the cam 20 would then be supported as shown in FIGS. 6 and 7.

For locking the cams in locked position, I have provided a vertical removable pin 25 which projects in a vertical direction through a hole 28 in an upper bracket 26 on support 19 and a similar hole in bracket 24. Each of cams 16' is provided with a pair of radially spaced holes such as hole 27 which aligns with the hole 28 when the cam is in its normal position and also when the cam is rotated as when it is supported in slots 54 or on ledge 55. Thus, it is seen that the pin 25 projects through holes of all cams 16' to lock them in position, the upper cams of cams 16' being in rotated condition, the central cam 20 being in rotated condition and the lower cams of cams 16' being in normal position.

In my modified construction as shown in FIG. 6, that portion of the lever 13 between fulcrum pin 14 and weight 15 is bent downwardly and then inwardly to provide a cam engaging portion 57 engaging only the cam, such as cam 20, supported in slots 54, the portion 58 of lever 13 extending outwardly around the upper cams of cams 16'.

Figure 8:
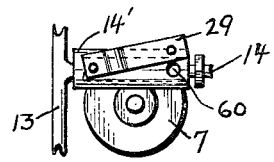
FIG. 8 is a fragmentary plan view of a portion of the sprinkler shown in FIG. 6, and showing the means to lock the device's lever out of action so as to form a circular pattern without the use of a cam.
Figure 9:
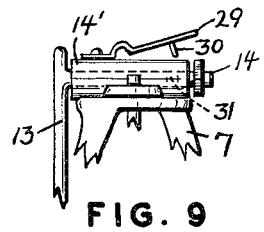
FIG. 9 is a fragmentary front view of that portion of the sprinkler shown in FIG. 8.

Referring to FIGS. 8 and 9, it will be seen that, if desired, a leaf spring 29 may be secured by one end on bearing member 14' and biased outwardly. The other end of spring 29 is provided with a downwardly protruding locking pin 30 which is adapted to protrude through an appropriated hole 60 in bearing member 14' and pass through a radial hole 31 in fulcrum pin 14. The radial hole 31 is so positioned that the lever 13 must be rotated to a position where the clapper 9 cannot engage end 12 thereof before the hole 31 is aligned for receiving pin 30. Thus, once holes 60 and 31 are aligned and the leaf spring 29 depressed to project into holes 60 and 31, the leaf spring 29 and pin 30 will be frictionally retained therein when the weight 15 of lever 13 is released.

Of course to disengage pin 30, the weight 15 need only be lifted momentarily. When the pin 30 is engaged, however, no camming action by lever 13 is accomplished and hence the sprinkler will sprinkle in a circular pattern.

As seen in FIG. 6 there is provided on the clapper 9, an upwardly and outwardly projecting pin 32 such that, when the clapper is opened wide and the lever 13 is raised high and the lever end 12 placed over the pin 32, the clapper 9 will be retained out of the jet stream and the lever away from the cams so as to permit the user to change a cam while the water is flowing without getting wet.

Figure 10:
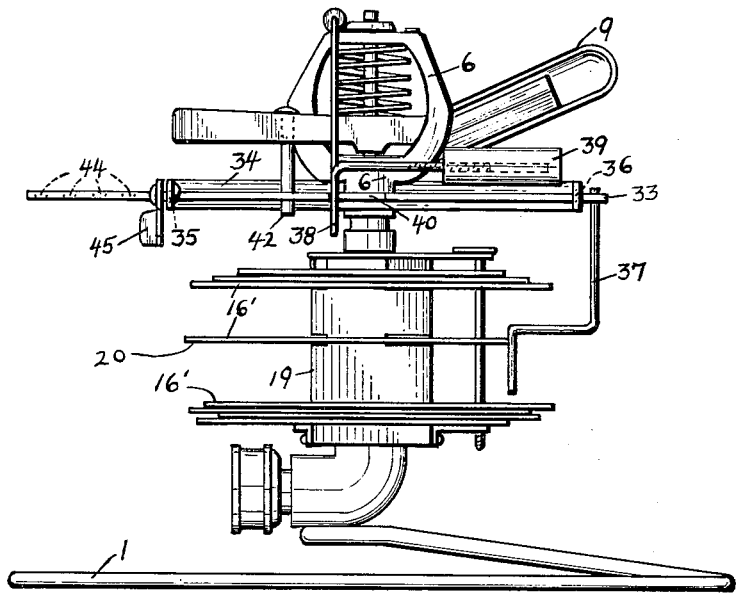
FIG. 10 is a side view of an alternate type of sprinkler, utilizing a sliding bar instead of a lever as shown in FIG. 6.
Figure 12:
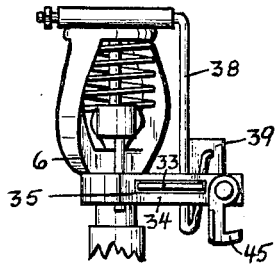
FIG. 12 is a fragmentary rear view of a portion of the sprinkler shown in FIG. 10.
Figure 11:
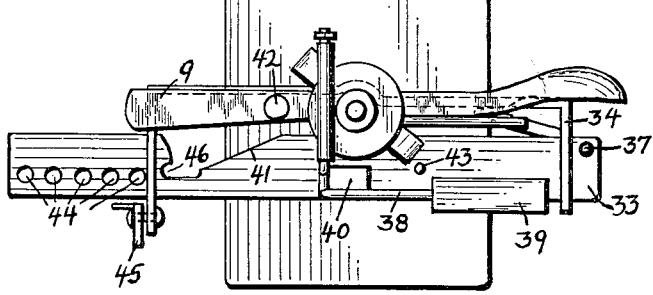
FIG. 11 is a plan view of a portion of the sprinkler shown in FIG. 10.

In the modified form of the apparatus shown in FIGS. 10, 11 and 12, a slide bar 33 is substituted for the lever 13. In this embodiment, a horizontally disposed bracket 34 is secured to head 6. The bracket 34 has spaced arms provided with aligned slots 35 and 36 which slidably retain the slide bar 33. At one end of the slide bar, a cam follower rod 37 projects downwardly and inwardly so as to engage the cam 20. The cam follower rod 37 and slide bar 33 are urged to the left in FIGS. 10 and 11 whereby rod 37 engages the cam 20 by means of a lever 38 which is pivotally secured by one end to the upper portion of head 6 and projects downwardly through an opening 40 in slide bar 33 and then is bent upwardly so as to extend again through opening 40. Above the slide bar 33 lever 38 projects outwardly, the other end of lever 38 being provided with an adjustable weight 39.

Adjacent the clapper 9, the slide bar 33 is cut away to provide an inwardly extending straight edge 41 which tapers toward the end of the slide bar opposite the end carrying the rod 37. A pin 42 projecting downwardly from the clapper is adapted to engage the edge 41 at a point determined by the position of the slide bar 33. When the slide bar 33 is as far to the left as possible, the pin 42 engages the edge 41 where it is closest to the rest position of pin 42, thereby providing a small amplitude of oscillation for the clapper. However, as the slide bar is moved progressively to the right in FIGS. 10 and 11, the pin 42 engages increments of the edge 41, spaced further and further from the at rest position of pin 42 and hence the amplitude of oscillation of clapper 9 progresses accordingly.

Thus, it is seen that the cam 20 will determine at what portion of edge 41 the pin 42 will engage, the cam follower rod 37 urging the slide bar 33 to the right in response to its radial position on cam 20 and the weight 39 urging the slide bar to the left. It will also be understood that with each beat of the clapper 9, the cam follower rod 37 will be urged momentarily away from the cam 20 as previously described for lever 13. It can be seen that as the bar 33 slides back and forth, the travel distance of the pin 42 to the slanted edge 41 is increased and decreased according to the shape of the cam and will thereby produce a jet pattern compatible with the cam's shape.

The bar 33 is furnished with a rivet 43 to preclude forward withdrawal. The bar 33 is also provided with holes 44 so as to enable the locking of the bar in various positions by means of the pivoted latch 45 so as to form circles of various sizes at full water flow without the use of cams. For locking the clapper 9 out of the jet stream and the cam follower fully away from the cams so as to permit changing a cam while the water is flowing, a notch 46 is incorporated in the bar and engages the pin 42 when the bar is pushed forward and the clapper is opened wide and the pin placed in the notch.

In the practice of the invention, it will be understood that the device is not limited to the specific structural details and arrangements herein presented but that numerous changes, modifications and the full use of equivalents may be resorted to in the practice of the invention without departing from the spirit or scope of the appended claims. It will be further understood that while the invention as herein set forth presents various structural features which may be independently operable and may function for securing various advantageous features, such elements of the invention may be separately used and may be combined other than here presented.

I claim:

1. A sprinkler having a rotary distribution head, impulse clapper means to rotate said distribution head by means of clapper oscillation, cam means in association with and variably controlling the amplitude of oscillation of said clapper means, the combination of said means causing said sprinkler to form an area spray pattern and said head to vary in rotational speed during each revolution of said head.

2. A sprinkler having a rotary distribution head, impulse clapper means to rotate said distribution head, cam means in association with and variably controlling the amplitude of said clapper means so as to cause said sprinkler to form an area spray pattern substantially similar to the shape of a cam included in said cam means and said head to vary in rotational speed during each revolution of said head with said speed variance being controlled by said cam means.

3. A fluid dispensing sprinkler having a rotary distribution head, impulse clapper means to rotate said distribution head, pivoted lever means mounted on said head, a cam-plate mounted on said sprinkler, with said lever means controlled by said cam-plate, and said lever means variably controlling the amplitude of said clapper means so as to cause said sprinkler to form an area spray pattern in conformance with said cam-plate's pattern and said head to vary in rotational speed during each revolution of said head with said speed variance being controlled by said cam-plate's pattern.

4. The device as set forth in claim 3, in which said lever means are actuated by gravity and include adjustable weight means to compensate for various fluid pressures.

5. The device as set forth in claim 3, with means for removably mounting said cam-plate.

6. The device as set forth in claim 3, with means to distribute said fluid in a jet stream with adjustable means to vary the stream size of said jet.

7. A fluid dispensing sprinkler having a rotary distribution head, impulse clapper means to rotate said distribution head by means of clapper oscillation, pivoted lever means mounted on said head, a multiplicity of various shaped cams mounted on said sprinkler, with means to place any one of said cams in position to control said lever means, with said lever means controlling the amplitude of oscillation of said clapper means so as to cause said sprinkler to form an area spray pattern in conformance with any one of said cams in said control position and said head to vary in rotational speed during each revolution of said head with said speed variance being controlled by the shape of any one of said cams in said control position.

8. The device as set forth in claim 7, including a straight sided base, with one or more sides of said base being aligned with one or more sides of said cams so as to facilitate visual alignment of said sprinkler in regard to said area pattern to be sprinkled.

9. The device as set forth in claim 7, with means to form a circular area pattern without the use of a cam.

10. The device as set forth in claim 7, with means to lock said clapper means and said lever means in a position so as to permit placing any one of said cams in control position while fluid is being dispensed without wetting the user.

11. A fluid dispensing sprinkler having a rotary distribution head, impulse clapper means to rotate said distribution head, slideable bar means mounted on said head, with means to constantly urge said slideable bar means in one direction, a multiplicity of various shaped cams mounted on said sprinkler, with means to place any one of said cams in position to control said slideable bar means, with said slideable bar means variably controlling the amplitude of said clapper means so as to form an area spray pattern in conformance with any one of said cams in said control position and said head to vary in rotational speed during each revolution of said head with said speed variance being controlled by the shape of any one of said cams in said control position.

12. The device as set forth in claim 11, in which said slideable bar urging means consist of gravity impelled lever means including adjustable weight means to compensate for various fluid pressures.

13. The device as set forth in claim 11, with means to form various sized circular area spray patterns at full fluid flow without the use of cams.

14. The device as set forth in claim 11, with means to lock said clapper means and said slideable bar means in a position so as to permit placing any one of said cams in control position while fluid is being dispensed without wetting the user.

15. The device as set forth in claim 11, including a straight sided base, with one or more sides of said base being aligned with one or more sides of said cams so as to facilitate visual alignment of said sprinkler in regard to said area pattern to be sprinkled.

References Cited in the file of this patent

UNITED STATES PATENTS

| | | |
|---|---|---|
| 1,593,918 | Stanton | July 27, 1926 |
| 2,654,635 | Lazzarini | Oct. 6, 1953 |
| 2,780,488 | Kennedy | Feb. 5, 1957 |
| 2,816,798 | Royer | Dec. 17, 1957 |
| 2,904,261 | Johnson | Sept. 15, 1959 |